United States Patent [19]

Schaefer

[11] 3,801,791
[45] Apr. 2, 1974

[54] OZONE GENERATOR

[76] Inventor: Richard J. Schaefer, 16582 Murray Hill Ave., Detroit, Mich. 48235

[22] Filed: Nov. 15, 1971

[21] Appl. No.: 198,937

Related U.S. Application Data

[63] Continuation of Ser. No. 801,674, Feb. 24, 1969, abandoned.

[52] U.S. Cl. .................................. 250/532, 250/536
[51] Int. Cl. ............................................. C01b 13/12
[58] Field of Search ...................... 204/176, 313-322

[56] References Cited
UNITED STATES PATENTS

| | | | |
|---|---|---|---|
| 2,403,241 | 7/1946 | Schaefer | 204/313 |
| 3,335,080 | 8/1967 | Waller et al. | 204/313 |

FOREIGN PATENTS OR APPLICATIONS 635,244  1/1962  Canada

OTHER PUBLICATIONS

Materials Application Guide, Dow Corning Corp., 1967 pgs. 2, 3, 11 and 12.

*Primary Examiner*—T. Tufariello
*Attorney, Agent, or Firm*—Barnes, Kisselle, Raisch & Choate

[57] ABSTRACT

An ozone generating device having a plurality of interleaved ground and high potential electrodes mounted in spaced relation with their faces opposed. The faces of each electrode are encapsulated between a pair of uniformly distributed low stress glass plates which are adhered to the faces of the electrode by a moisture impervious and ozone resistant flexible bonding material such as silicone rubber. Spacers are inserted between opposed glass plates to form passageways for air to be ozonized by an alternating electrical field between the electrodes. A low impedance transformer with closely spaced primary and secondary windings is used to supply an alternating current to the electrodes. A plurality of the ground and high potential electrodes are assembled into a cell which is encapsulated in an outer enclosure by a moisture impervious ozone resistant material such as silicone rubber. The use of a moisture impervious ozone resistant material to fabricate the electrode assemblies and encapsulate the cell reduces the tendency for arcing to occur between the electrodes and thereby materially increases the useful life of the cell.

27 Claims, 10 Drawing Figures

OZONE GENERATOR

REFERENCE TO ANOTHER PATENT APPLICATION

This is a continuation of my copending Ozone Generator Patent application, Ser. No. 801,674 filed Feb. 24, 1969 and now abandoned in favor of this continuation.

This invention relates to devices for producing ozone and more particularly to improvement in ozone generating devices and methods of making such devices.

Ozone generating devices usually have a series of generally parallel spaced apart interleaved high potential and ground electrodes between which air is passed to convert pure oxygen or oxygen in the air to ozone. A device of this general type in which both electrodes are sealed between glass plates and the assemblies of glass plates and electrodes are encapsulated in an enclosure by a bituminous asphalt organic bonding material is disclosed in my expired U.S. Pat. No. 2,403,241. A problem with this type of device is that the moisture in the air and the ozone and heat produced by operation of the device cause the dielectric properties of most organic bonding materials particularly bituminous materials to deteriorate to such an extent that there is arcing between the electrodes resulting in a comparatively short useful life of the ozone generator. Deterioration of the bonding material also allows separation of the glass plates from the metal electrode. Separation of the glass plates from the electrode materially weakens and decreases the durability of the electrode and glass plate assemblies and allows moisture and ozone in the air to come in direct contact with the metal electrode. The moisture in the air and ozone and heat produced by the operation of the device oxidize and deteriorate the metal electrode, thereby shortening the useful life of the device.

Objects of this invention are to provide an ozone generating device (1) which has a substantially longer useful life than prior generating devices, (2) in which the electrode and glass plate assemblies are more rugged, durable, and free from fracture than prior generating devices, (3) which has a substantially greater efficiency or ozone output per watt hour of electrical energy input than prior generating devices, (4) which does not expose operating and service personnel to the safety hazard of an electrical shock, (5) which can be used without creating an electrical hazard or being damaged in installations where water or some other conductive liquid may back up into the device while it is being operated, and (6) which is of economic, durable and rugged construction and easily and economically assembled.

These and other objects and features of this invention will be apparent from the following detailed description and accompanying drawings in which.

Figure 1:
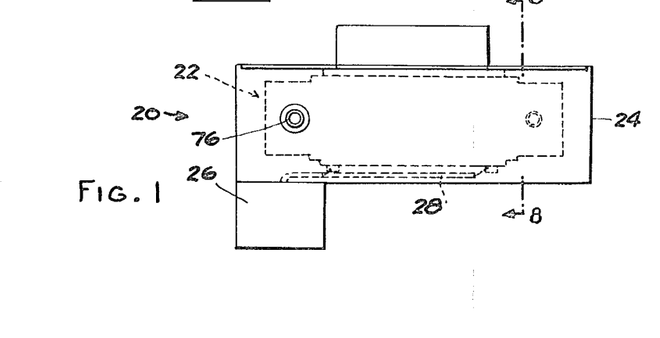
FIG. 1 is a side view of an ozone generating device constructed in accordance with this invention.
Figure 2:
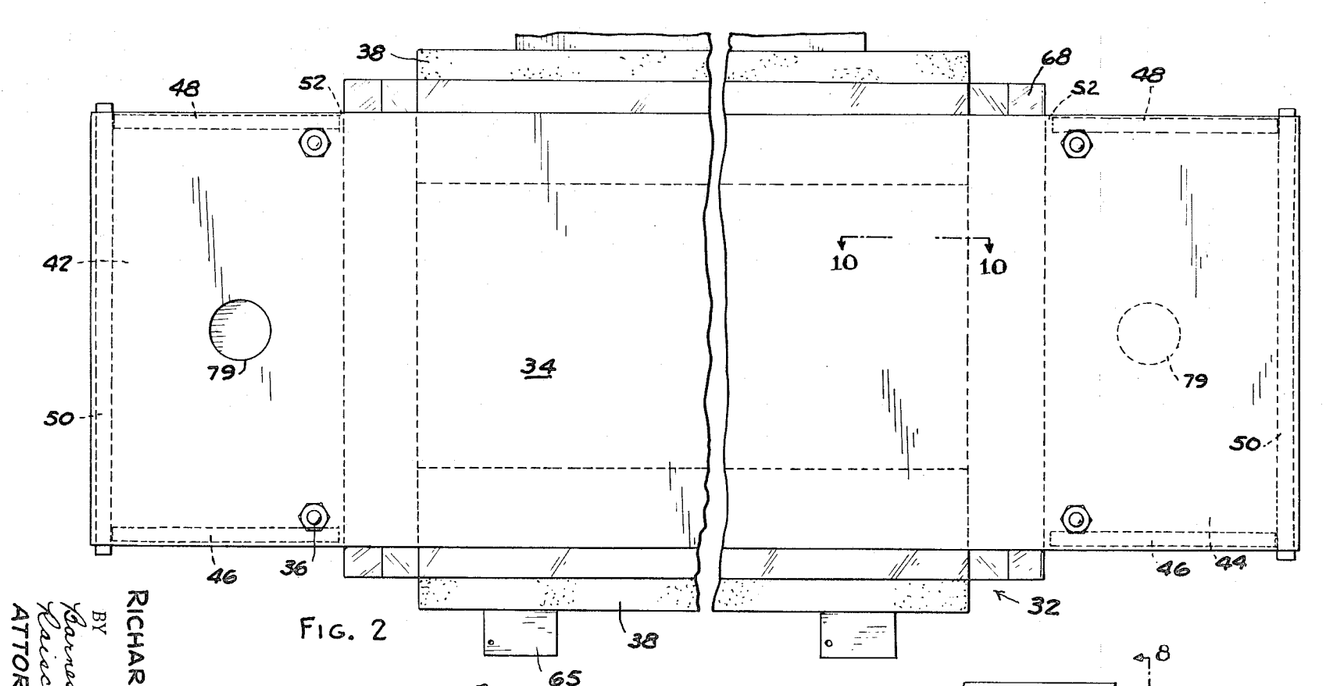
FIG. 2 is a side view of a generating cell of the device of FIG. 1 with the outer enclosure removed.
Figure 5:
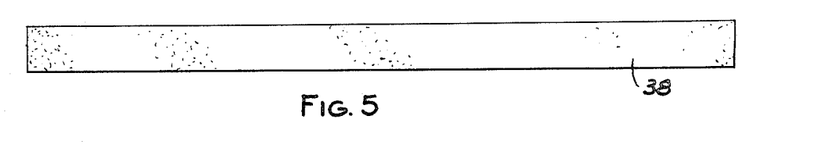
FIG. 5 is a side view of a dielectric spacer positioned between the high potential and ground electrodes in the generating cell of FIG. 2.

Referring to the drawings:

FIG. 1 illustrates an ozone generating unit of this invention designated generally as 20 with an ozone generating cell designated generally as 22 encapsulated in an outer enclosure 24. A step-up transformer 26 is mounted on the lower portion of enclosure 24 and connected to cell 22 by a high potential lead wire 28. As illustrated in FIG. 7, ozone cell 22 has a plurality of interleaved ground and high potential electrode assemblies 30 and 32 which are sandwiched and held between two steel carrier plates 34 by bolt and nut assemblies 36. Spacers 38 (FIGS. 2, 5 and 6) preferably of a dielectric material are positioned between electrode assemblies 30 and 32 adjacent their upper and lower edges to provide passageways 40 (FIG. 8) between the electrode assemblies through which air to be ozonized can flow. To facilitate forcing air through passageways 40, an air inlet housing 42 is provided adjacent one end of the high potential and ground electrode assemblies and an ozone outlet housing 44 is provided adjacent the other end of the electrode assemblies. Housings 42 and 44 are each formed by top and bottom plates 46 and 48 and an end plate 50 which are secured to steel carrier plates 34 by some suitable means such as a polyester resin to provide an airtight seal between the housing plates and carrier plates 34. Top and bottom housing plates 46 and 48 are positioned so that there is a slight gap 52 between the plates and the ends of high potential electrode assemblies 32 so that the electrodes are free to expand without interference from the plates as explained in greater detail hereinafter. Preferably, housing plates 46, 48 and 50 are of a transparent acrylic material, such as the material sold under the trademark "Plexiglass," so that it can be visually observed during assembly if inlet and outlet housings 42 and 44 become obstructed or clogged. Acrylic materials also have the advantage of being very resistant to deterioration by exposure to moisture and ozone.

Electrode assemblies 30 and 32 have metallic electrodes which are shielded from direct contact with moisture in the air and ozone generated by the cell which would attack and severely oxidize and deteriorate the electrodes so that the cell would soon become inoperative. Since glass plates are impervious to moisture and are not attacked or deteriorated by ozone and also provide a dielectric or insulator to prevent arcing between the electrodes, they are usually used to encase and shield the electrodes. Glass plates having low internal mechanical stresses and strains which are uniformly distributed throughout the glass and a high dielectric constant are used to encase the electrodes because such glass plates are less subject to fracture during use than highly stressed plates and provide a generating cell with increased efficiency or a higher output of ozone per unit of electrical energy input. A commercially available glass plate with a comparatively high dielectric constant and uniformly distributed low internal stress is soda lime picture-frame glass which can be purchased from Libby Owens Ford Co. This picture-frame glass also has a substantially higher dielectric constant than high stress Pyrex glass. A uniformly distributed low internal stress high dielectric constant glass plate is believed to be less subject to fracture during use and to provide a cell with increased efficiency because its molecules are more mobile or responsive to changes in the direction of the electric field between the electrodes than are the molecules in highly stressed glass. Prior generating cells have used a borosilicate type glass sold under the trademark "Pyrex" because of its low coefficient of thermal expansion or ordinary window glass because of its low cost. Borosilicate or Pyrex glass has high internal mechanical stresses as compared to picture-frame glass and ordinary window glass has an uneven stress distribution with localized areas of high stress. Molecules of highly stressed glass do not respond as readily to changes in the direction of the electric field as do molecules of low stress glass and hence the high stress glass is more subject to fracture. Since the molecules are more mobile in low stress glass than in high stress glass, less electrical energy is dissipated in moving the molecules when the electric field changes direction and hence the efficiency or ozone output per unit of energy input of the cell is increased. Regardless of the theoretical explanation, it has been found that an ozone cell constructed with uniformly distributed low internal stress glass plates having a high dielectric constant requires approximately one-half of the electrical energy input of similar cells constructed with high mechanical stress Pyrex glass plates per pound of ozone output. Another feature of uniformly distributed low internal stress glass plates is that they can be made thinner than high stress Pyrex or ordinary window glass plates while still having adequate physical strength. With thinner glass plates the electrodes can be spaced closer together without reducing the size of the passage through which air flows between the plates. Positioning the electrodes closer to each other is also believed to increase the efficiency of the ozone cell. Using plates having a higher dielectric constant is also believed to increase the efficiency of the cell and because of the enhanced electrical insulative properties it allows the electrodes to be placed closer together without inducing arcing between the electrodes. For example, ozone cells can be constructed with uniformly distributed low stress glass plates having a thickness in the range of 0.062 to 0.020 of an inch.

Because the metallic electrodes and the glass plates or cells usually have materially different coefficients of thermal expansion, the material bonding or adhering the glass plates to an electrode must allow the electrode to work or move relative to the glass plates. Depending on the particular operational environment the cell and electrode assemblies may be subjected to a temperature change ranging from well below freezing to upward of 130°F. The bonding material must also be a satisfactory electrical insulator to prevent arcing between the electrode assemblies. It has been found that most organic binders such as asphalt while allowing the electrodes to work or move with respect to the glass plates also absorb moisture and are subject to ozone attack and deterioration so that on prolonged exposure to moisture and ozone they become electrically conductive and allow arcing to occur between the outer ends or side edges of adjacent high potential and ground electrode assemblies. The arcing between the electrode assemblies destroys the ozone cell and ends its useful life. It has been found that silicone rubber is a highly satisfactory insulative bonding material which will adhere the glass plates to an electrode and that its insulative properties when subjected to ozone in a moist atmosphere, while subject to some deterioration, do not deteriorate to such an extent that it becomes electrically conductive and permits arcing to occur between the ends or edges of adjacent high potential and ground electrode assemblies. A suitable silicone rubber bonding material is Dow Corning No. 850 room temperature vulcanizing silicone rubber which is used with a curing agent, Dow Corning catalyst S for room temperature vulcanizing silicone rubber. Silicone rubber bonding materials which cure at room temperature are preferred because an electrode can be adhered or sealed to glass plates without inducing additional mechanical stresses in the glass plates and the assembly. Since the glass plates and electrode have different coefficients of expansion, if the glass plates and electrode assembly was heated to cure the silicone rubber when the assembly was subsequently cooled, the glass plates would be stressed or strained because the metal electrode and glass plates would not contract to the same extent when cooled. This would have the undesirable effect of stressing the glass plates which would make them more subject to fracture during prolonged use in the cell and would also decrease the efficiency of the cell as noted above. This would also place the bonding material under greater stress which would increase the tendency for it to shear or separate from the glass plates and the electrode. As well as reducing the mechanical strength of the assembly, the shearing or separation of the bonding material would cause portions of the electrode to be oxidized and deteriorated by exposure to the moisture and ozone passing through the cell. Hence it is preferred that the bonding materials be cured at a temperature in the range of 60° to 80°F. In fact, it has been found that heat curing at approximately 200°F. of a polyester bonding material in some electrode assemblies having highly stressed glass actually causes the glass to immediately shatter when the electrode assembly is cooled.

Figure 3:
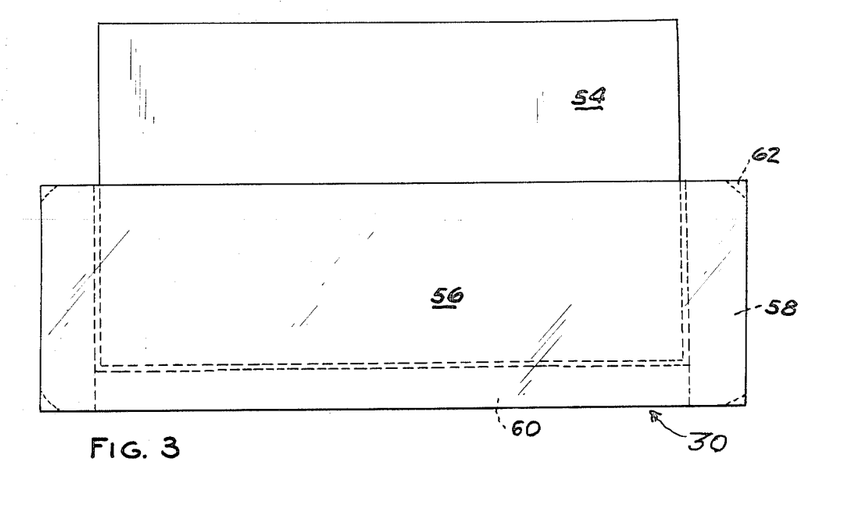
FIG. 3 is a side view of a ground electrode assembly of the generating cell of FIG. 2.
Figure 6:
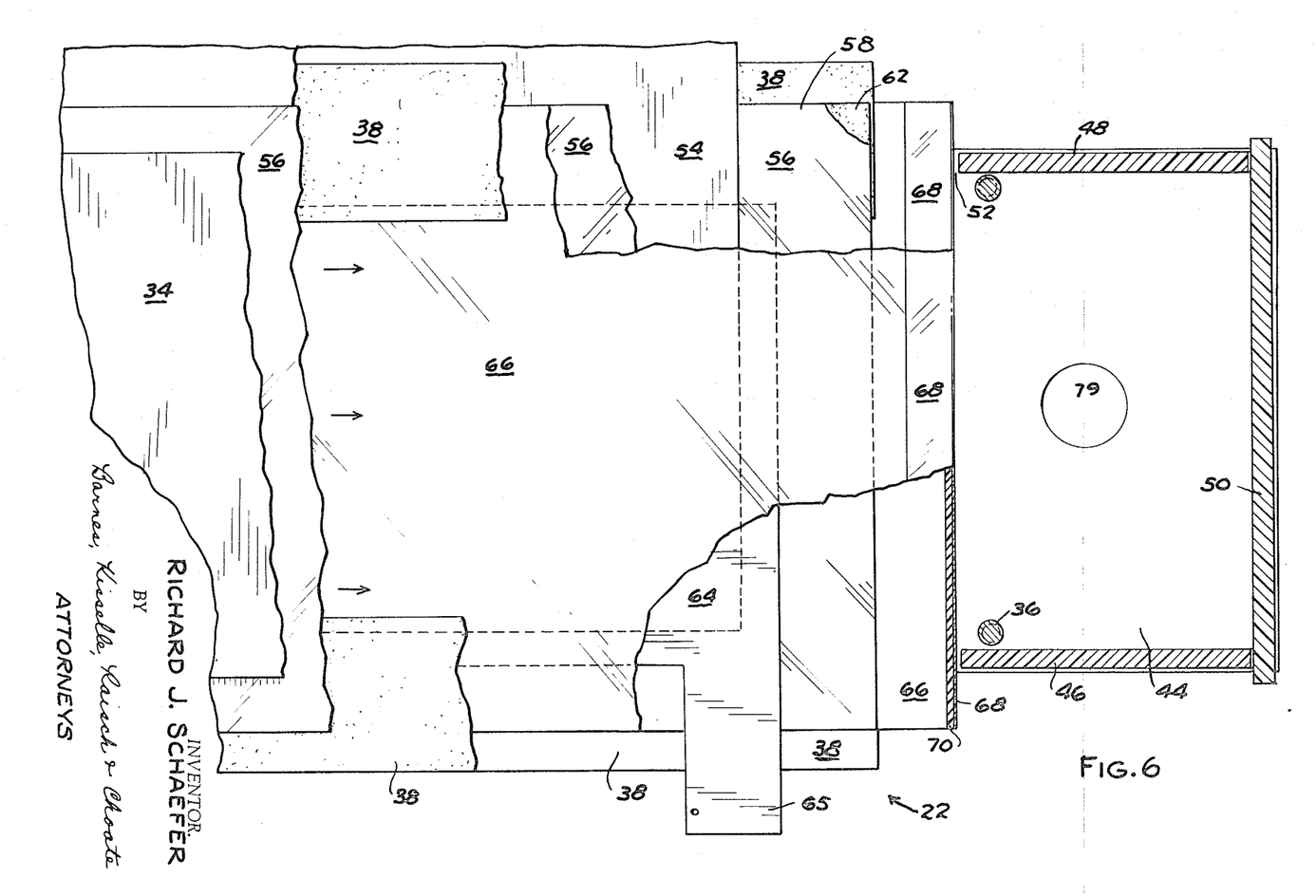
FIG. 6 is a fragmentary side view partially in section of the generating cell of FIG. 2 illustrating the arrangement of the electrode assemblies and spacers and some of the details of construction of the high potential and ground electrode assemblies.
Figures 7, 8, 9, 10:
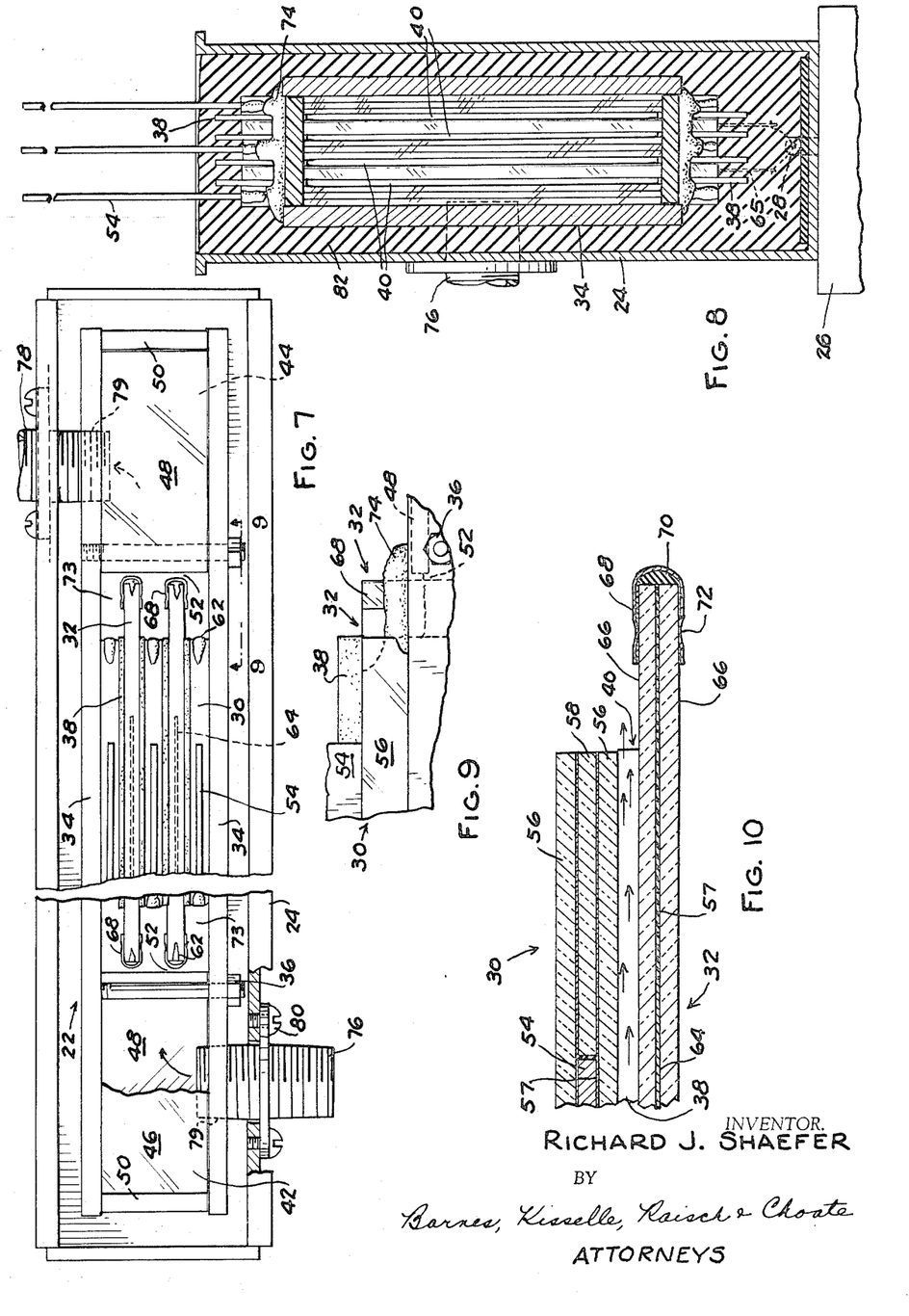
FIG. 7 is a plan view of the device of FIG. 1 illustrating the mounting of the generating cell within the outer enclosure before the cell is encapsulated in the enclosure.
FIG. 8 is a sectional view on line 8—8 of FIG. 1 illustrating the generating cell suspended and encapsulated in the outer enclosure.
FIG. 9 is a fragmentary sectional view on line 9—9 of FIG. 7 illustrating a flexible material filling and sealing a gap between the electrode assemblies and an ozone outlet housing.
FIG. 10 is an enlarged fragmentary sectional view on line 10—10 of FIG. 2 illustrating some of the details of construction of the high potential and ground electrode assemblies.

As shown in FIGS. 3, 6 and 10, ground electrode assembly 30 has a metallic electrode 54, the lower half of which is encased between uniformly distributed, low stress glass plates 56 which are adhered to electrode 54 by a silicone rubber bonding material 57. Ground electrode 54 is formed of a good electrical and heat conductive metal such as copper or aluminum. The ground electrode extends upward from glass plates 56 and is substantially thicker than the high potential electrodes to dissipate heat generated during operation of the cell as described in greater detail hereinafter. Because of the comparatively low strength of the silicone rubber bonding and sealing material and the thickness of electrode 54, glass plate fillers 58 are inserted adjacent the outer edges of electrode 54 and a glass filler 60 is inserted adjacent the bottom of electrode 54 between fillers 58. Because of the different coefficients of expansion, a slight gap should be left between the outer edges of electrode 54 and the adjacent edges of glass fillers 58 and 60. For ease of fabrication and to increase the strength of the electrode assemblies, a polyester resin 62, such as the polyester resin sold by Cadillac Plastic & Chemical Co., Detroit, Michigan, is applied to the four corners of plates 56 to adhere the plates to fillers 58 and each other. The pair of glass plates can be connected together at any point which does not interfere with the expansion and contraction of the electrode, but the four corners are the most convenient points. Electrode assembly 30 is fabricated by applying a thin coating of the silicone rubber bonding material to one face of a glass plate 56 and electrode 54 and then placing the coated faces in contact with each other. A thin coating of silicone rubber is then applied to one face of fillers 58 and 60 and they are positioned on the glass plate. A thin coating of silicone rubber is then applied to the other face of fillers 58 and 60, and electrode 54 and to one face of the other glass plate 56 which is then placed in contact with the electrode and fillers. The assembly of glass plates and electrode is placed in a vacuum chamber and the air between the glass plates and the electrode is removed. After the air is removed, the assembly of glass plates and electrode is exposed to moist atmosphere at room temperature to cure the silicone rubber. It is important that substantially all of the air be removed from between the electrode and the glass plates because any entrapped air would be converted to ozone when the cell is operated which would attack and oxidize the metal electrode.

Figure 4:
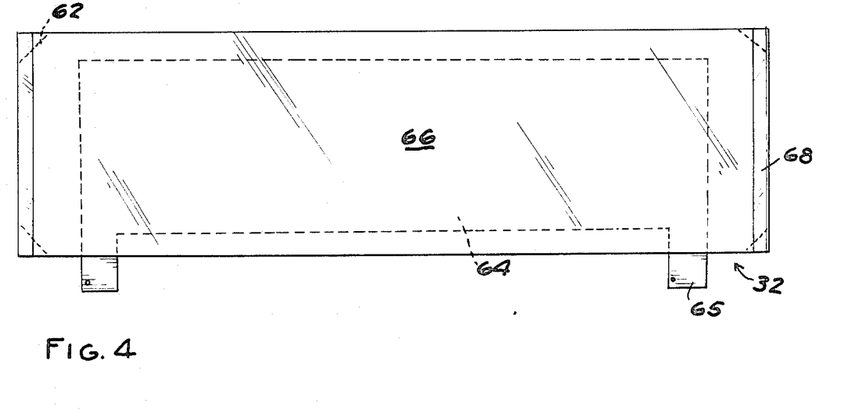
FIG. 4 is a side view of a high potential electrode assembly of the generating cell of FIG. 2.

As shown in FIGS. 4, 6 and 10, high potential electrode assembly 32 has a metallic electrode 64, such as a sheet of nickel steel or copper, with electrical connector tabs 65 encased within two uniformly distributed low stress glass plates 66 which are similar to but longer than glass plates 56. High potential electrode 64 can be substantially thinner than ground electrode 54 because it is not used to dissipate heat from the cell and preferably is substantially thinner than electrode 54 so that it is not necessary to use fillers between glass plates 66. High potential electrode assemblies 32 can be fabricated by the same method as the ground electrode assemblies and glass plates 66 are adhered to each other at their corners by a polyester resin 62 to facilitate fabrication and increase the strength of the electrode assembly. Glass plates 66 of high potential electrode assemblies 32 are substantially longer than the glass plates of ground electrode assemblies 30 so that when they are interleaved to form the cell the ends of alternate electrode assemblies will extend beyond the ends of the intermediate electrode assemblies. With this arrangement if after prolonged use of the cell the silicone rubber bonding material should become electrically conductive due to exposure to ozone and moisture, there would still be a long enough air gap between the ends or edges of adjacent electrode assemblies so that arcing would not occur. As an added precaution to further retard the adverse effect of ozone and moisture on the silicone rubber bonding material, a moisture and ozone impervious cap is placed over the ends of the high potential electrode assemblies so that the silicone rubber between the glass plates is not exposed to the moisture in the air and ozone passing through the cell. As shown in FIG. 10, a generally U-shaped cap 68 of a moisture impervious and ozone resistant material, such as tetraflouroethylene sold under the trademark "Teflon," overlies the end of the high potential electrode assemblies and is adhered to the assembly by a polyester resin 70, such as the polyester resin sold by Cadillac Plastic & Chemical Co., Detroit, Michigan. Because resin 70 is moisture absorbent, ribs 72 are formed in cap 68 to provide a discontinuity in polyester resin bonding material 70 so that the portion of the bonding material in contact with the silicone rubber is not exposed to and cannot absorb moisture or ozone from the air passing through the cell and after prolonged use of the cell provide an electrically conductive path from the end or edge of the high voltage electrode assembly to the ground electrode assembly. If desired, the ends of ground electrode 30 can also be provided with a Teflon cap or shield to prevent the silicone rubber bonding material in the ground electrode assembly from being exposed to moisture and ozone in the air passing through the cell.

To correct for the so-called edge effect or increased electric field and current density adjacent the edges of charged ground and high potential electrodes, each high potential electrode is slightly longer than the ground electrodes and is positioned closer to the bottom of its pair of glass plates. Hence when the cell is assembled high potential electrodes 64 extend beyond and below ground electrodes 54 (see FIG. 6) so that the sides and bottom of high potential electrodes 64 are out of the primary area of influence of the electric field between the electrodes. The edge effect is further reduced by rounding off the edges of the ground electrode and positioning spacers 38 of a high dielectric material, such as Bakelite, between the electrode assemblies so that the spacers overlap the top and bottom edges of the boundary of the electric field. In the structure shown in FIG. 6 the top boundary of the electric field is generally defined by the upper edge of the high potential electrode and the bottom boundary is generally defined by the lower edge of the ground electrode. In short, the electric field boundary is approximately at the point where adjacent electrodes between which the electric field is created cease to be overlapped. The use of overlapping electrode edges, overlapping dielectric spacers, and rounded edges on the ground electrodes reduces the tendency for the insulative properties of the glass plates and silicone rubber bonding material to break down which would result in a spark discharge between the electrodes and also provides a more gradual change in the electrical strain on the glass plates which reduces their tendency to fracture.

As shown in FIG. 9, after electrode assemblies 30 and 32 and spacers 38 have been sandwiched between carrier plates 34 and the air inlet housing 42 and ozone outlet housing 44 have been formed adjacent opposite ends of the electrode assemblies, openings 73 between the electrode assemblies and the ends of housing plates 46 and 48 are filled with a flexible resilient material 74 such as silicone rubber to seal off the openings between the electrode assemblies and the housings so that all air which enters the inlet housing must pass through spaces 40 between the electrode assemblies and out of the cell through outlet housing 44. Sealing material 74 must remain flexible and resilient throughout the operational life of the ozone cell so that it can move with the expansion and contraction of the electrode assemblies as they alternately become heated and cooled during normal intermittent operation of the cell. Because of the expansion and contraction of the high potential electrode assemblies 32, it is also important that gap 52 between the ends of the electrode assemblies and the housing plates be maintained so that the electrode assemblies will be free to expand and contract without interference from or restriction by housing plates 46 and 48. A silicone rubber with a doughy or putty-like consistency, such as Dow Corning No. 892 room temperature vulcanizing silicone rubber, is preferred because it is easier to seal the opening and gap 52 without also getting the rubber into housings 42, 44 or spaces 40 which would impede the flow of air through the cell.

After generating cell 22 is completely assembled, it is suspended in outer enclosure 24 and high potential transformer lead 28 is electrically connected to tabs 65 of high potential electrodes 64 (FIG. 8). The ground potential lead of transformer 26 is connected to ground potential electrodes 54 through metal enclosure 24 to assure that both the metal enclosure and ground electrodes are at the same potential. As shown in FIG. 7, cell 22 is suspended in outer enclosure 24 by high chromium steel bulkhead inlet and outlet fittings 76 and 78 which extend through openings in outer enclosure 24 and air passage holes 79 in carrier plates 22. Bulkhead fittings 76 and 78 are secured to outer enclosure 24 by threaded screws 80. After cell 22 is suspended in outer enclosure 24, it is encapsulated within enclosure 24 by a moisture impervious and ozone resistant flexible material 82, such as silicone rubber. Cell 22 can be encapsulated in enclosure 24 by simply pouring a liquid silicone rubber mixture into the enclosure. A highly satisfactory silicone rubber material for encapsulating cell 22 is Dow Corning No. 850 room temperature vulcanizing silicone rubber which is mixed with a curing agent Dow Corning catalyst S for room temperature vulcanizing silicone rubber. Room temperature curing encapsulating materials are preferred to heat curing materials so that the electrode assemblies are not subjected to stresses created by an elevated curing temperature and different coefficients of expansion for the glass plates and metal electrodes. The use of silicone rubber to encapsulate the cell provides a moisture impervious and highly ozone resistant seal around all of the outwardly exposed edges of the electrode assemblies and other portions of cell 22. This arrangement also totally encompasses and insulates high potential electrode 28 so that personnel operating and servicing this ozone generating device are not exposed to the hazards of an electrical shock. Since all of the electrodes and high potential lead wire 28 are enclosed in moisture impervious silicone rubber, this cell will not be damaged and operating personnel will not be subjected to a potentially dangerous and hazardous situation if this cell is used in installations where water or some other conductive liquid may on occasion back up through fitting 78 and ozone outlet housing 44 into air passages 40 between the electrode assemblies. The resiliency of the silicone rubber also provides a vibration and impact damping mounting of the cell in the outer enclosure which decreases the likelihood of the glass plates being fractured by a blow, vibration or other impact transmitted to the enclosure when the generating device is in its operational environment.

When this cell is installed, it is arranged so that air is blown lengthwise over and caused to circulate past the upper portion of ground electrodes 54 which extend above enclosure 24 to carry away heat generated by operation of the ozone generator. It has been found that by constructing a cell with ground electrodes of aluminum approximately 17 ½ inches long, 10 inches wide, and 0.062 inches thick and with high potential electrodes of nickel steel approximately 18 inches long, 5 inches wide, and 0.005 inches thick that the cell will normally reach a stabilized operating temperature in the range of approximately 70° to 110°F. The stabilized operating temperature is partially dependent on the temperature of the atmosphere in the operational environment which may range from substantially below freezing to in excess of 100°F.

It has been found that if some means of removing heat from cell 22 is not provided, it will reach a temperature of 150°F. to 180°F. in about 45 minutes of continuous operation and will fail or become permanently damaged and inoperable shortly thereafter. Hence it is important to provide ground electrodes with an adequate thickness and volume of metal to dissipate sufficient heat so that cell 22 normally operates at a temperature below approximately 120°F. Since it is believed that placing the ground and high potential electrode assemblies closer together increases the efficiency of the cell and because increased thickness of high potential electrodes 64 would require the use of fillers between the glass plates, it is desirable to make the electrodes as thin as possible consistent with the thickness required to provide adequate cooling of the cell and satisfactory electrical properties. Since the high potential electrodes do not provide any significant cooling of the cell, they can be made extremely thin on the order of 0.002 to 0.005 of an inch thick. If desired, a thermostat with a closed electrical contact set to open approximately at 130°F. can be attached to a ground electrode 54 and the contact connected to the circuit of transformer 26 to prevent the cell from being damaged by overheating.

Preferably, transformer 26 is of the low impedance step-up type having a closely spaced coupling between the primary and secondary windings. The low impedance close coupling helps to smooth out the irregular current and voltage peaks produced by the high capacitance load of ozone cell 22 so that they more nearly have a sinusoidal wave form. Reducing the voltage and current peaks decreases the tendency of the insulative properties of the dielectric glass plates and silicone rubber bonding material to break down and become electrically conductive. Hence reducing the peaks increases the useful life of ozone cell 22. Reducing the voltage and current peaks also increases the power transferred to cell 22. The ozone cell can be operated in the range of approximately 5,000 to 15,000 volts 60 CPS alternating current. It is preferred that cell 22 be operated at approximately 7,000 volts because the lower voltage places less stress and strain on the glass plates and silicone rubber bonding material.

The above described embodiment of this invention with spaced electrode assemblies 30 and 32 having a pair of glass plates 56 and 66 sealed to each electrode 54 and 64 respectively as shown in FIG. 10 by a nonconductive bonding material 57 such as silicone rubber which does not deteriorate sufficiently when subjected to ozone in a moist atmosphere to become conductive and permit arcing between adjacent electrodes resulting in destruction of the ozone generator 20 has the advantages of ozonizing oxygen in a moist atmosphere such as ordinary atmospheric air and a longer useful life than prior generating devices. The aforementioned use of soda lime glass plates 56 and 66 having lower and more uniformly distributed internal stresses than borosilicate or Pyrex glass plates and the slightly flexible and resilient silicone rubber bonding material 57 provides electrode and glass plate assemblies 30, 32 of durable and rugged construction which can be readily assembled and have a decreased tendency of the glass plates 56 and 66 to fracture. The aforementioned use of other than borosilicate glass plates 56 and 66 having a thickness in the range of approximately 0.062 to 0.020 of an inch and a low impedance step-up transformer 26 with closely spaced primary and secondary windings provides an ozone generator 20 having a greater overall efficiency or ozone output per unit of electrical energy input than prior generating devices. The encapsulation as shown in FIG. 8 of the sealed electrode assemblies 30 and 32 with electrically insulative ozone and moisture resistant material 82 such as silicone rubber provides an ozone generator 20 which neither creates an electrical hazard nor is damaged when water or other conductive liquid backs up into the ozone generator 20 while it is operating and does not expose operating and service personnel to the safety hazard of an electrical shock. The previously described sealing of glass plates 56 and 66 to electrodes 54 and 64 and encapsulation of the electrode assemblies 30 and 32 in case 24 with slightly flexible and resilient materials 57 and 82 such as silicone rubber provides an ozone generator 20 of rugged and durable construction which can be easily and economically manufactured and assembled.

I claim:

1. A generating cell for ozonizing oxygen in a moist atmosphere comprising ground and high potential electrodes having opposed faces, a pair of glass plates of other than borosilicate type glass each having a thickness not greater than approximately 0.062 of an inch adjacent the opposed faces of each of said electrodes, means for spacing adjacent opposed pairs of glass plates to provide a passageway therebetween for air to be ozonized, and a moisture and ozone resistant electrically non-conductive flexible material which does not become electrically conductive when continuously exposed to moist ozone interposed between each of said glass plates and its respective electrode approximately throughout the entire portion of the face of the associated electrode covered by each of said glass plates such that all gases are excluded from contact with the portion of the face of each of said electrodes covered by each of said glass plates such that each of said electrodes and its associated pair of glass plates can expand and contract with respect to each other due to temperature changes without breakage of said glass plates or separation of said electrodes from said glass plates, whereby the generating cell has a long useful life in ozonizing oxygen in a moist atmosphere.

2. The cell as defined in claim 1 in which said moisture and ozone resistant electrically nonconductive flexible material comprises a silicone rubber material.

3. The cell as defined in claim 2 in which said glass plates have a thickness in the range of approximately 0.062 to 0.020 of an inch.

4. The cell as defined in claim 1 in which said glass plates have a thickness in the range of 0.062 to 0.020 of an inch and a dielectric constant equal to or greater than any borosilicate Pyrex glass.

5. The cell as defined in claim 1 in which said glass plates have a thickness in the range of 0.062 to 0.020 of an inch.

6. The cell as defined in claim 2 in which said glass plates are of soda lime glass having substantially uniformly distributed stresses and a thickness in the range of 0.062 to 0.020 of an inch.

7. The cell as defined in claim 1 in which at least one end of said pairs of glass plates of alternate electrodes extend substantially beyond the corresponding end of pairs of glass plates of electrodes intermediate said alternate electrodes whereby the tendency of a spark discharge to occur adjacent at least one end of pairs of glass plates of charged adjacent ground and high potential electrodes is decreased.

8. The cell as defined in claim 2 in which opposed ends of said pairs of glass plates of alternate electrodes extend substantially beyond corresponding ends of pairs of glass plates of electrodes intermediate said alternate electrodes whereby the tendency of a spark discharge to occur adjacent an end of pairs of glass plates of charged adjacent ground and high potential electrodes is decreased.

9. The cell as defined in claim 1 which also comprises at least one cap of a moisture impervious ozone resistant material overlying at least one end and the bonding material adjacent that one end of at least one of said pairs of glass plates whereby said cap seals said bonding material adjacent said end from contact with moisture and ozone.

10. The cell as defined in claim 8 which also comprises at least one cap of a moisture impervious ozone resistant material overlying at least one end and the bonding material adjacent that end of at least one of said pairs of glass plates whereby said cap seals said bonding material adjacent said one end from contact with moisture and ozone.

11. The cell as defined in claim 10 in which the cap comprises an elongated generally U-shaped channel having inwardly and longitudinally extending opposed ribs adjacent its free edges.

12. The cell as defined in claim 1 in which said ground electrodes extend in at least one direction beyond their associated glass plates into the atmosphere such that when the cell is operating heat is dissipated from the exposed surfaces of the extended portions of said ground electrodes into the atmosphere to air cool the cell.

13. The cell as defined in claim 12 in which the surface area of the extended portions of said ground electrodes is great enough whereby the cell normally operates at a temperature of less than approximately 120°F.

14. The cell as defined in claim 1 which also comprises strips of an electrically insulative material between adjacent opposed pairs of glass plates each overlapping an edge of an electrode defining a boundary of the electrical field between adjacent electrodes whereby said insulating material reduces the edge effect when said adjacent electrodes are charged.

15. The cell as defined in claim 7 which also comprises strips of an electrically insulative material between adjacent opposed pairs of glass plates each overlapping an edge of an electrode defining a boundary of the electrical field between adjacent electrodes whereby said insulating material reduces the edge effect when said adjacent electrodes are charged.

16. The cell as defined in claim 9 which also comprises strips of an electrically insulative material between adjacent opposed pairs of glass plates each overlapping an edge of an electrode defining a boundary of the electrical field between adjacent electrodes whereby said insulating material reduces the edge effect when said adjacent electrodes are charged.

17. The cell as defined in claim 1 which also comprises a moisture and ozone resistant electrically nonconductive flexible material encapsulating said electrodes with said glass plates sealed thereto and said means for spacing said pairs of glass plates, whereby the generating cell is encapsulated.

18. The cell as defined in claim 2 which also comprises a moisture and ozone resistant electrically nonconductive flexible material encapsulating said electrodes with said glass plates sealed thereto and said means for spacing said pairs of glass plates, whereby the generating cell is encapsulated.

19. The cell as defined in claim 4 which also comprises a moisture and ozone resistant electrically nonconductive flexible material encapsulating said electrodes with said glass plates sealed thereto and said means for spacing said pairs of glass plates, whereby the generating cell is encapsulated.

20. The cell as defined in claim 7 which also comprises a moisture and ozone resistant electrically nonconductive flexible material encapsulating said electrodes with said glass plates sealed thereto and said means for spacing said pairs of glass plates, whereby the generating cell is encapsulated.

21. The cell as defined in claim 9 which also comprises a moisture and ozone resistant electrically nonconductive flexible material encapsulating said electrodes with said glass plates sealed thereto and said means for spacing said pairs of glass plates, whereby the generating cell is encapsulated.

22. The cell as defined in claim 12 which also comprises a moisture and ozone resistant electrically nonconductive flexible material encapsulating said electrodes with said glass plates sealed thereto and said means for spacing said pairs of glass plates, whereby the generating cell is encapsulated.

23. The cell as defined in claim 1 which also comprises a low impedance transformer having a closely spaced coupling between the primary and secondary windings with said secondary winding electrically connected to said ground and high potential electrodes whereby the efficiency and useful life of the generating cell is increased.

24. The cell as defined in claim 2 which also comprises a low impedance transformer having a closely spaced coupling between the primary and secondary windings with said secondary winding electrically connected to said ground and high potential electrodes whereby the efficiency and useful life of the generating cell is increased.

25. The cell as defined in claim 7 which also comprises a low impedance transformer having a closely spaced coupling between the primary and secondary windings with said secondary winding electrically connected to said ground and high potential electrodes whereby the efficiency and useful life of the generating cell is increased.

26. The cell as defined in claim 17 which also comprises a low impedance transformer having a closely spaced coupling between the primary and secondary windings with said secondary winding electrically connected to said ground and high potential electrodes whereby the efficiency and useful life of the generating cell is increased.

27. The cell of claim 23 in which said transformer applies a potential to said electrodes in the range of 5,000 to 15,000 volts alternating current.

* * * * *